US007852373B2

(12) United States Patent
Uenaka

(10) Patent No.: US 7,852,373 B2
(45) Date of Patent: Dec. 14, 2010

(54) ANTI-SHAKE APPARATUS INCLUDING CALCULATION OF ANGULAR VELOCITY

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 653 days.

(21) Appl. No.: 11/775,889

(22) Filed: Jul. 11, 2007

(65) Prior Publication Data

US 2008/0012945 A1  Jan. 17, 2008

(30) Foreign Application Priority Data

Jul. 13, 2006 (JP) .............................. 2006-192711
Jul. 13, 2006 (JP) .............................. 2006-192849

(51) Int. Cl.
*H04N 5/228* (2006.01)
*G03B 17/00* (2006.01)
(52) U.S. Cl. .............. 348/208.2; 348/208.4; 348/208.5; 396/55
(58) Field of Classification Search .............. 348/208.2, 348/208.4, 208.5; 396/55
See application file for complete search history.

(56) References Cited

U.S. PATENT DOCUMENTS

| 5,634,142 | A | * | 5/1997 | Imafuji et al. ................. 396/52 |
| 5,655,158 | A | * | 8/1997 | Kai ............................. 396/55 |
| 5,930,531 | A | * | 7/1999 | Kitagawa et al. .............. 396/55 |
| 5,999,746 | A | * | 12/1999 | Kitagawa ..................... 396/52 |
| 6,127,667 | A | * | 10/2000 | Enomoto ................. 250/201.2 |
| 6,263,162 | B1 | * | 7/2001 | Yamazaki et al. ............. 396/55 |
| 2005/0232617 | A1 | | 10/2005 | Uenaka et al. |
| 2005/0265704 | A1 | | 12/2005 | Uenaka et al. |
| 2005/0265705 | A1 | | 12/2005 | Uenaka |
| 2006/0083502 | A1 | * | 4/2006 | Higo ........................... 396/55 |
| 2006/0187335 | A1 | * | 8/2006 | Ohtsuka et al. ............. 348/369 |
| 2007/0003262 | A1 | * | 1/2007 | Shiratori ....................... 396/55 |

FOREIGN PATENT DOCUMENTS

JP          7 261233        10/1995

OTHER PUBLICATIONS

English language Abstract of JP 7-261233.
U.S. Appl. No. 11/775,887 to Uenaka, filed Jul. 11, 2007.
U.S. Appl. No. 11/775,886 to Uenaka, filed Jul. 11, 2007.
U.S. Appl. No. 11/775,891 to Uenaka, filed Jul. 11, 2007.

* cited by examiner

*Primary Examiner*—David L Ometz
*Assistant Examiner*—Quang V Le
(74) *Attorney, Agent, or Firm*—Greenblum & Bernstein P.L.C.

(57) ABSTRACT

An anti-shake apparatus comprises an angular velocity sensor and a controller. The angular velocity sensor detects an angular velocity. The controller controls the angular velocity sensor and performs an anti-shake operation based on the output signal from the angular velocity sensor. The controller calculates an angular velocity signal, based on the output signal from the angular velocity sensor before a predetermined period which is longer than a predetermined time interval and the output signal from the angular velocity sensor after the predetermined period, at the predetermined time interval, during the predetermined period.

11 Claims, 11 Drawing Sheets

ANTI-SHAKE APPARATUS INCLUDING CALCULATION OF ANGULAR VELOCITY

BACKGROUND OF THE INVENTION

1. Field of the Invention

The present invention relates to an anti-shake apparatus for a photographing apparatus, and in particular to an operating control for performing the anti-shake operation with minimal errors.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. H07-261233 discloses an apparatus that executes an interruption process for performing the anti-shake operation on a constant sampling cycle.

However, there is a time period when the DSP communicates with the controller, such as the CPU, that the anti-shake operation cannot be performed on the constant sampling cycle.

SUMMARY OF THE INVENTION

Therefore, an object of the present invention is to provide an apparatus that can effectively perform the anti-shake operation even if the anti-shake operation cannot be performed on the constant sampling cycle.

According to the present invention, an anti-shake apparatus comprises an angular velocity sensor and a controller. The angular velocity sensor detects an angular velocity. The controller controls the angular velocity sensor and performs an anti-shake operation based on the output signal from the angular velocity sensor. The controller calculates an angular velocity signal, based on the output signal from the angular velocity sensor before a predetermined period which is longer than a predetermined time interval and the output signal from the angular velocity sensor after the predetermined period, at the predetermined time interval, during the predetermined period.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
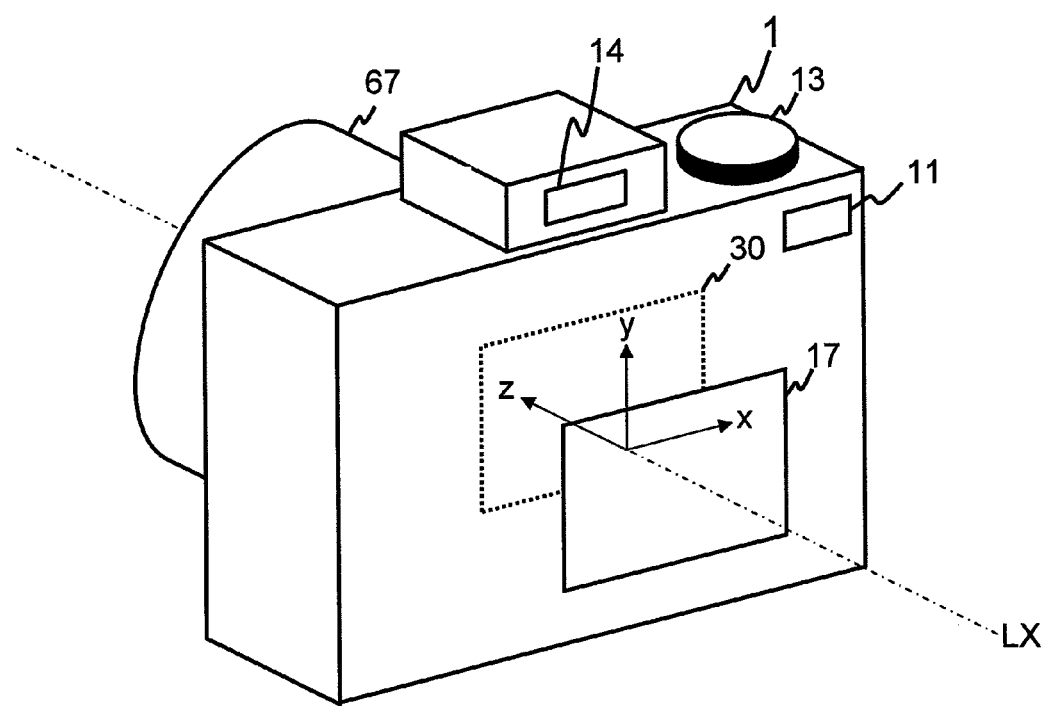
FIG. 1 is a perspective view of the first and second embodiments of the photographing apparatus viewed from the back side.

The present invention is described below with reference to the embodiment shown in the drawings. In the embodiments, the photographing apparatus 1 is a digital camera. A camera lens 67 of the photographing apparatus 1 has an optical axis LX.

In order to explain the direction in the embodiments, a first direction x, a second direction y, and a third direction z are defined (see FIG. 1). The first direction x is a direction which is perpendicular to the optical axis LX. The second direction y is a direction which is perpendicular to the optical axis LX and the first direction x. The third direction z is a direction which is parallel to the optical axis LX and perpendicular to both the first direction x and the second direction y.

Figure 2:
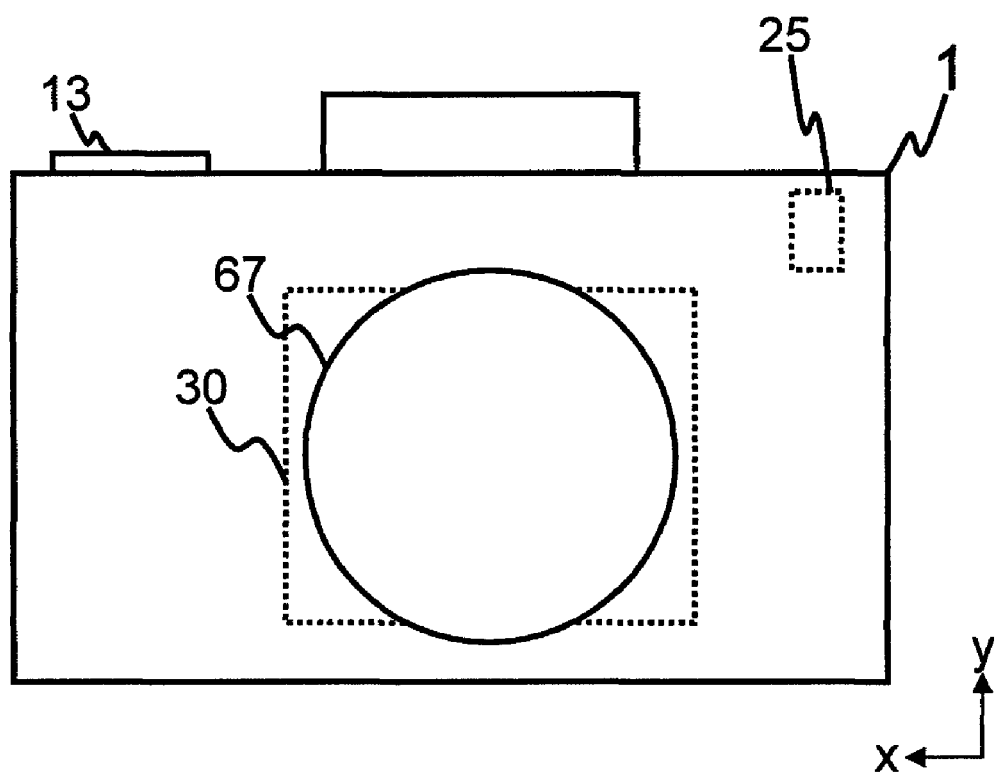
FIG. 2 is a front view of the photographing apparatus.
Figure 3:
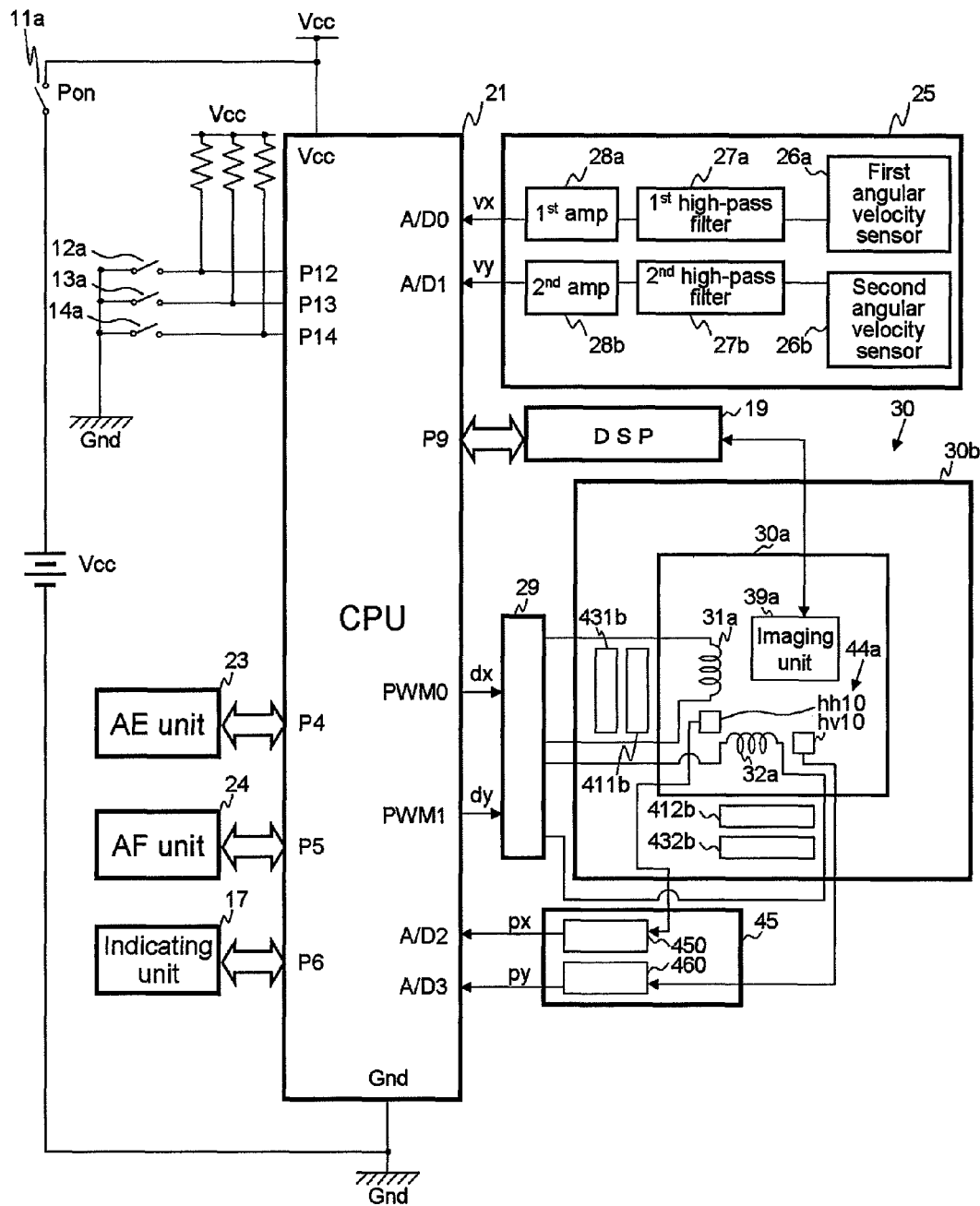
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state is determined by the state of the PON button 11, so that the ON/OFF states of the photographing apparatus 1 correspond to the ON/OFF states of the PON switch 11a.

The photographic subject image is captured as an optical image through the camera lens 67 by the imaging unit 39a, and the captured image is displayed on the indicating unit 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation is performed, and the image which is captured, is stored.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39a. The DSP 19 communicates with the CPU 21 after the exposure time. During communication with the CPU 21, release information such as the shutter speed etc is transmitted from the CPU 21 to the DSP 19.

The CPU 21 is a control apparatus that controls each part of the photographing apparatus 1 regarding the imaging operation and the anti-shake operation. The anti-shake operation includes both the movement of the movable unit 30a and position-detection efforts.

Further, the CPU 21 stores a value of the anti-shake parameter IS that determines whether the photographing apparatus 1 is in the anti-shake mode or not, a value of the anti-shake operation determination parameter CAM_DIS, and a value of the time interval parameter T that measures the time interval of the anti-shake operation.

Further, the CPU 21 stores values of a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

Figure 4:
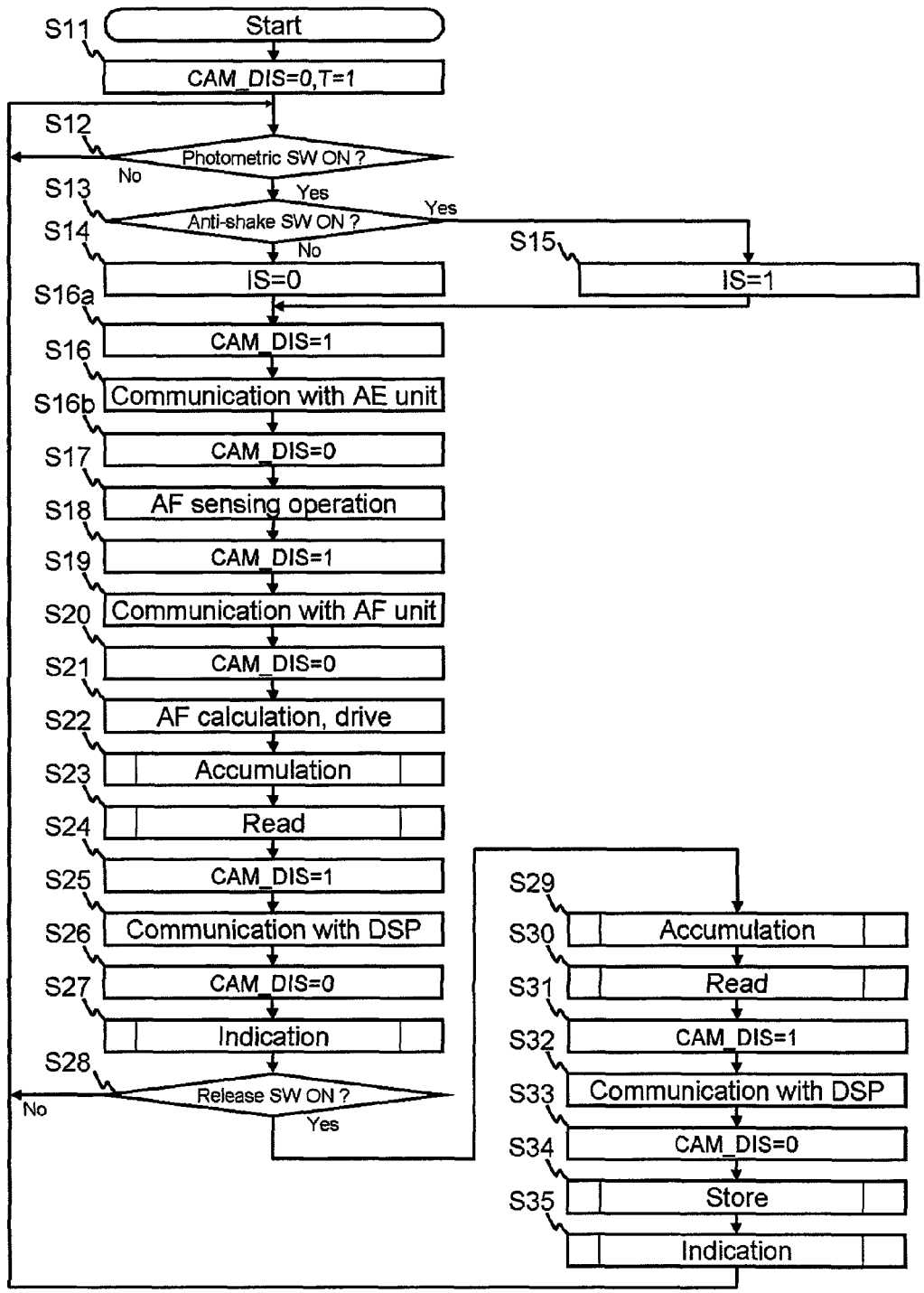
FIG. 4 is a flowchart of the main operation of the photographing apparatus.

The value of the anti-shake operation determination parameter CAM_DIS is set to 1 while a predetermined operation is performed (a non-operation period), such as the transmission of information regarding the AF sensing operation from the AF sensor of the AF unit 24 to the CPU 21 and the communication of the DSP 19 with the CPU 21 etc., to indicate a condition in a predetermined time interval which prevents carrying out the anti-shake operation (1 ms) (see steps S18, S24, and S32 in FIG. 4).

Otherwise, the value of the anti-shake operation determination parameter CAM_DIS is set to 0 to indicate the condition where the anti-shake operation can be performed at the predetermined time interval (1 ms) (see steps S20, S26, and S33 in FIG. 4).

When the value of the anti-shake operation determination parameter CAM_DIS is set to 1, the anti-shake operation is not performed. When the value of the anti-shake operation determination parameter CAM_DIS is set to 0, the anti-shake operation is performed at the predetermined time interval (1 ms).

The time interval parameter T represents a length of time during which the value of the anti-shake operation determination parameter CAM_DIS is continuously set to 1. In other words, the time interval parameter T indicates a time interval in which the anti-shake operation is performed.

The time interval in which the anti-shake operation is performed is generally set to a predetermined time interval: 1 ms.

Figure 5:
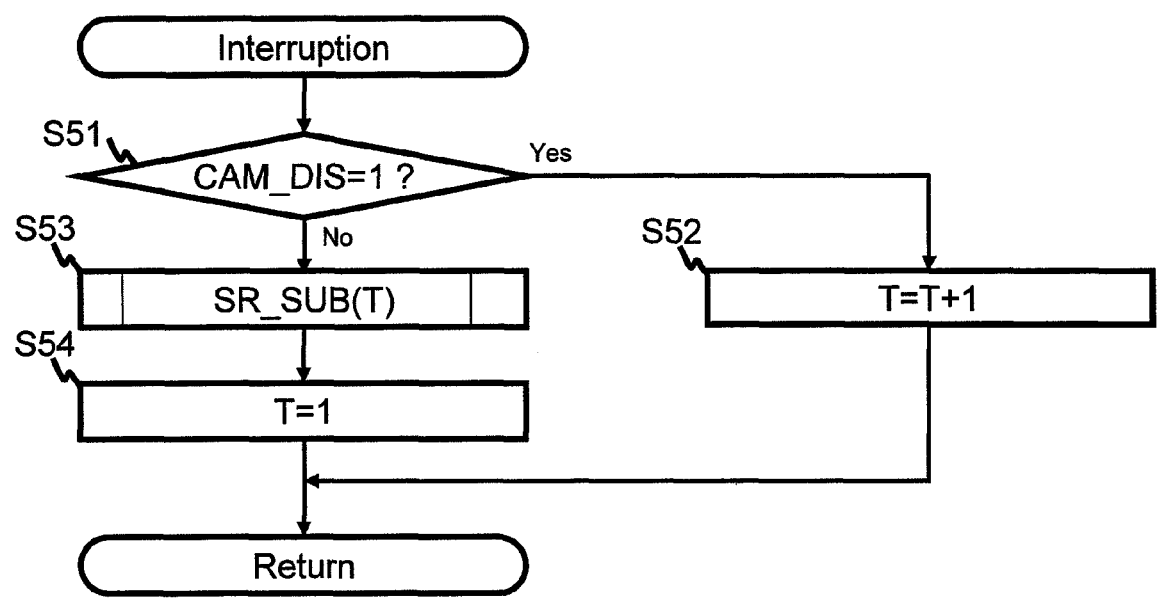
FIG. 5 is a flowchart that shows the detail of the interruption process of the timer.

When the value of the anti-shake operation determination parameter CAM_DIS is set to 0 based on the 1 ms time interval that has been set, in other words, when the anti-shake operation can be performed at the predetermined 1 ms time interval, the value of the time interval parameter T is set to 1 (see step S54 in FIG. 5).

When the value of the anti-shake operation determination parameter CAM_DIS is set to 1, in other words, when the anti-shake operation cannot be performed at the predetermined 1 ms time interval, the time that the value of the anti-shake operation determination parameter CAM_DIS is continuously set to 1 is measured and the value of the time interval parameter T is set to the measured value (see step S52 in FIG. 5).

The value of the time interval parameter T is used as a parameter for the anti-shake operation. A process that is carried out when the value of the time interval parameter T is set to 1 is different from that when the value of the time interval parameter T is not set to 1 (see step S92 in FIG. 7).

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The imaging preparation period includes a photometric operation in the AE unit 23, an AE period during which information regarding the aperture value and the time length of the exposure is transmitted from the AE unit 23 to the CPU 21, and an AF period during which information regarding the AF sensing operation is transmitted from the AF unit 24 to the CPU 21. The length of time of each imaging preparation is approximately 10 to 30 ms, which is longer than the length of time required to perform one anti-shake operation (1 ms). As a result, a load to the CPU 21 is increased during the imaging preparation period.

The anti-shake part (the anti-shake apparatus) of the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state and the anti-shake operation is performed, where the angular velocity detection unit 25 and the anti-shake unit 30 are driven independently of other operations such as the photometric operation etc. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0).

When the predetermined operation is performed, such as the transmission of information regarding the AF sensing operation from the AF sensor of the AF unit 24 to the CPU 21, and the communication of the DSP 19 with the CPU 21 etc., the anti-shake operation is not carried out. When the predetermined operation is not performed, the anti-shake operation is carried out at the predetermined time interval.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity Vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut-off frequency of the secondary digital high-pass filter processing operation is higher than that of the primary analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 1, and indicates a length of time (ms) from the point when the anti-shake operation commences (the interruption process of the timer commences, t=1, see step S11 in FIG. 4) to the point when the latest anti-shake operation (t=n) is performed. Because the anti-shake operation may or may not be performed at the predetermined time interval (1 ms), the case exists where the value of "n" does not agree with the number of times that the anti-shake operation is performed.

Figure 8:
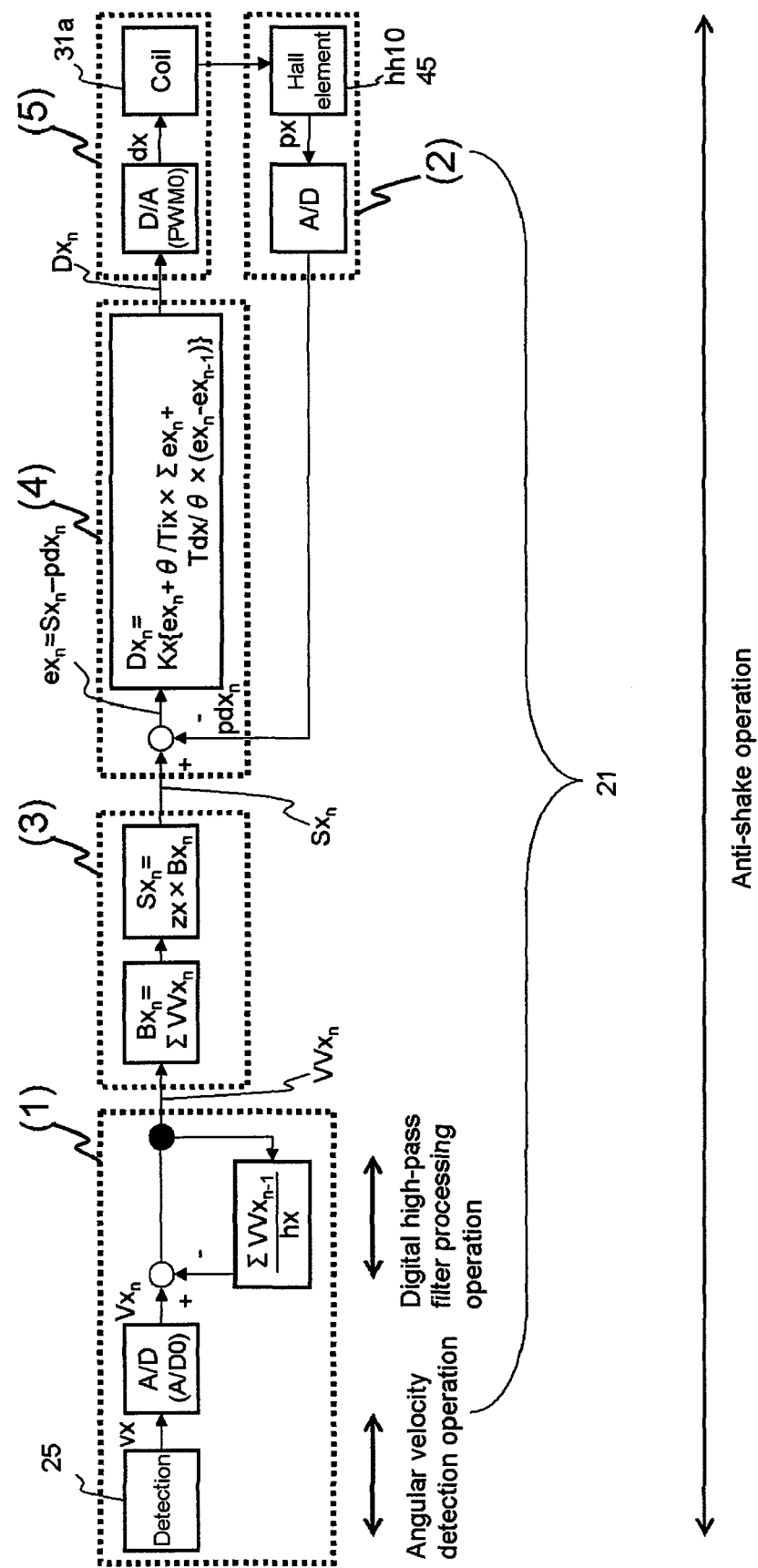
FIG. 8 is a figure that shows calculations in the anti-shake operation.

In the digital high-pass filter processing operation regarding the first direction x, the first digital angular velocity $VVx_n$ is calculated by dividing the summation of the first digital angular velocity $VVx_1$ to $VVx_{n-1}$ calculated by the interruption process of the timer before the latest anti-shake operation is performed, by the first high-pass filter time constant hx, and then subtracting the resulting quotient from the first digital angular velocity signal $Vx_n$ ($VVx_n = Vx_n - (\Sigma VVx_{n-1}) \div hx$, see (1) in FIG. 8).

In the digital high-pass filter processing operation regarding the second direction y, the second digital angular velocity $VVy_n$ is calculated by dividing the summation of the second digital angular velocity $VVy_1$ to $VVy_{n-1}$ calculated by the interruption process of the timer before the latest anti-shake operation is performed, by the second high-pass filter time constant hy, and then subtracting the resulting quotient from the second digital angular velocity signal $Vy_n$ ($VVy_n = Vy_n - (\Sigma VVy_{n-1}) \div hy$).

In the first embodiment, the angular velocity detection operation in (portion of) the anti-shake operation includes a process in the angular velocity detection unit 25 and a process of inputting the first and second angular velocities vx and vy from the angular velocity detection unit 25 to the CPU 21.

Due to hardware limitations and a communications process in the CPU 21, the case does exist where the angular velocity detection operation in the anti-shake operation cannot be performed at the predetermined time interval (1 ms) while the predetermined portions of the imaging operation and the image processing operation are performed.

In the first embodiment, the value of the first and second digital angular velocity signals $Vx_k$ and $Vy_k$ (n-T<k<n-1) are calculated by interpolation in a non-operation period when the angular velocity detection operation cannot be performed at the predetermined time interval (1 ms).

The first digital angular velocity signal $Vx_k$ is calculated by interpolating based on average values generated from the first digital angular velocity signals $Vx_{n-T}$ and $Vx_n$. The first digital angular velocity signal $Vx_{n-T}$ is calculated immediately before the non-operation period. The first digital angular velocity signal $Vx_n$ is calculated immediately after the non-operation period.

The second digital angular velocity signal $Vy_k$ is calculated by interpolating based on average values generated from the second digital angular velocity signals $Vy_{n-T}$ and $Vy_n$. The second digital angular velocity signal $Vy_{n-T}$ is calculated immediately before the non-operation period. The second digital angular velocity signal $Vy_n$ is calculated immediately after the non-operation period.

In the integration processing operation regarding the first direction x, the first digital displacement angle $Bx_n$ is calculated by the summation from the first digital angular velocity $VVx_1$ at the point when the anti-shake operation commences (the interruption process of the timer commences, t=1, see step S11 in FIG. 4) to the first digital angular velocity $VVx_n$ at the point when the latest anti-shake operation is performed (t=n), ($Bx_n = \Sigma VVx_n$, see (3) in FIG. 8).

Similarly, in the integration processing operation regarding the second direction y, the second digital displacement angle $By_n$ is calculated by the summation from the second digital angular velocity $VVy_1$ at the point when the anti-shake operation commences to the second digital angular velocity $VVy_n$ at the point when the latest anti-shake operation is performed ($By_n = \Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) calculated for the first direction x and the second direction y, based on a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n = zx \times Bx_n$, see (3) in FIG. 8).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n = zy \times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device.

The anti-shake unit 30 has a fixed unit 30b, and a movable unit 30a which includes the imaging unit 39a and can be moved about on the xy plane.

When the anti-shake operation is not performed, the movable unit 30a is fixed to a predetermined position. In the first embodiment, the predetermined position is at the center of the range of movement.

The driving of the movable unit 30a of the anti-shake unit 30, including movement to a predetermined fixed position, is performed by the electro-magnetic force of the coil unit for driving and the magnetic unit for driving, through the driver circuit 29 which has the first PWM duty dx input from the PWM 0 of the CPU 21 and the second PWM duty dy input from the PWM 1 of the CPU 21 (see (5) in FIG. 8).

The detected-position $P_n$ of the movable unit 30a, either before or after the movement effected by the driver circuit 29, is detected by the hall element unit 44a and the hall-element signal-processing unit 45.

Information regarding the first coordinate of the detected-position $P_n$ in the first direction x, in other words a first detected-position signal px, is input to the A/D converter A/D 2 of the CPU 21 (see (2) in FIG. 8). The first detected-position signal px is an analog signal that is converted to a digital signal by the A/D converter A/D 2 (A/D conversion operation). The first coordinate of the detected-position $P_n$ in the first direction x, after the A/D conversion operation, is defined as $pdx_n$ and corresponds to the first detected-position signal px.

Information regarding the second coordinate of the detected-position $P_n$ in the second direction y, in other words a second detected-position signal py, is input to the A/D converter A/D 3 of the CPU 21. The second detected-position signal py is an analog signal that is converted to a digital signal by the A/D converter A/D 3 (A/D conversion operation). The second coordinate of the detected-position $P_n$ in the second direction y, after the A/D conversion operation, is defined as $pdy_n$ and corresponds to the second detected-position signal py.

The PID (Proportional Integral Differential) control calculates the first and second driving forces $DX_n$ and $Dy_n$ on the basis of the coordinate data for the detected-position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$, see (4) in FIG. 8). The first subtraction value $ex_n$ is calculated by subtracting the first coordinate of the detected-position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected-position $P_n$ in the second direction y after the A/D conversion operation, $pdy_n$, from the coordinate of position $S_n$ in the second direction y, $Sy_n$ ($ey_n = Sy_n - pdy_n$).

Although the value of the sampling cycle θ may be set equal to the variable time interval parameter T, the value of the sampling cycle θ is fixed to the 1 ms in the first embodiment.

Driving the movable unit 30a to the position $S_n$, ($Sx_n$, $Sy_n$) corresponding to the anti-shake operation of the PID control is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the first embodiment, the imaging device is a CCD; however, the imaging device may be another imaging device such as a CMOS etc.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction Y.

When the center area of the imaging device is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which is the form of the imaging surface of the imaging device, has two diagonal lines. In the first embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral-shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral-shaped coil pattern. The coil pattern of the second driving coil 32a has lines which are parallel to the first direction x, thus creating the second electro-magnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b on the side of the movable unit 30a in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b on the side of the movable unit 30a in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py, specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position $P_n$ of the movable unit 30a in the second direction y, to the A/D converter A/D 3 of the CPU 21, on the basis of the vertical potential-difference y10.

Next, the main operation of the photographing apparatus 1, including the photographing operation, is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

Further, the interruption process of the timer at the predetermined time interval (1 ms) commences. The value of the anti-shake operation determination parameter CAM_DIS is set to 0 and the value of the time interval parameter T is set to 1. The detail of the interruption process of the timer is explained later by using the flowchart in FIG. 5.

In step S12, it is determined whether the photometric switch 12a is set to the ON state. When it is determined that the photometric switch 12a is not set to the ON state, the operation returns to step S12 and the process in step S12 is repeated. Otherwise, the operation continues on to step S13.

In step S13, it is determined whether the anti-shake switch 14a is set to the ON state. When it is determined that the anti-shake switch 14a is not set to the ON state, the value of the anti-shake parameter IS is set to 0 in step S14. Otherwise, the value of the anti-shake parameter IS is set to 1 in step S15.

In step S16a, the value of the anti-shake operation determination parameter CAM_DIS is set to 1. In step S16, the AE sensor of the AE unit 23 is driven, the photometric operation is performed, the information regarding the aperture value and the time length of the exposure is transmitted from the AE unit 23 to the CPU 21, and the aperture value and exposure time are calculated. Therefore, the anti-shake operation is not performed while the CPU 21 communicates with the AE unit 23 or during the AE period while the information regarding the aperture value and the time length of the exposure is transmitted from the AE unit 23 to the CPU 21 (the non-operation period). Further, in step S16b, the value of the anti-shake operation determination parameter CAM_DIS is set to 0.

In step S17, the AF sensor and lens control circuit of the AF unit 24 are driven to perform the integration calculation for the AF sensing. In step S18, the value of the anti-shake operation determination parameter CAM_DIS is set to 1. In step S19, the information regarding the AF sensing operation is transmitted from the AF unit 24 to the CPU 21. Therefore, the anti-shake operation is not performed while the CPU 21 communicates with the AF unit 24 or during the AF period while the information regarding the AF sensing operation is transmitted from the AF unit 24 to the CPU 21 (non-operation period). Further, in step S20, the value of the anti-shake operation determination parameter CAM_DIS is set to 0.

In step S21, the AF driving calculation is made on the basis of the AF sensing operation, and the focus operations are performed by driving the lens control circuit of the AF unit 24 based on the calculation.

In step S22, the exposure operation, or in other words the electric charge accumulation of the imaging device (CCD etc.), is performed. After the exposure time has elapsed, the electric charge which has accumulated in the imaging device during the exposure time is read in step S23. In step S24, the value of the anti-shake operation determination parameter CAM_DIS is set to 1. In step S25, the CPU 21 communicates with the DSP 19 so that the release information is transmitted from the CPU 21 to the DSP 19, and the image processing operation is performed based on the electric charge read from the imaging device. Therefore, the anti-shake operation is not performed while the CPU 21 communicates with the DSP 19 or during the image processing operation (non-operation period).

Further, in step S26, the value of the anti-shake operation determination parameter CAM_DIS is set to 0.

In step S27, the image upon which the image processing operation is performed, is displayed on the indicating unit 17 (the through image indication or the live view indication).

In step S28, it is determined whether the release switch 13a is set to the ON state. When it is determined that the release switch 13a is not set to the ON state, the operation returns to step S12 and the process in steps S12 to S27 is repeated. Otherwise, the operation continues on to step S29.

In step S29, the exposure operation, or in other words the electric charge accumulation of the imaging device (CCD etc.), is performed. After the exposure time has elapsed, the electric charge which has accumulated in the imaging device during the exposure time is read in step S30. In step S31, the value of the anti-shake operation determination parameter CAM_DIS is set to 1. In step S32, the CPU 21 communicates with the DSP 19 so that the release information is transmitted from the CPU 21 to the DSP 19, and the image processing operation is performed based on the electric charge read from the imaging device. Therefore, the anti-shake operation is not performed while the CPU 21 communicates with the DSP 19 or during the image processing operation (non-operation period).

Further, in step S33, the value of the anti-shake operation determination parameter CAM_DIS is set to 0.

In step S34, the image upon which the image processing operation is performed, is stored to the memory in the photographing apparatus 1. In step S35, the image that is stored in the memory is displayed on the indicating unit 17, and the operation then returns to step S12.

Next, the interruption process of the timer, which commences in step S11 in FIG. 4 and is performed at every predetermined time interval (1 ms) independent of the other operations, is explained by using the flowchart in FIG. 5.

When the interruption process of the timer commences, it is determined whether the value of the anti-shake operation determination parameter CAM_DIS is set to 1 in step S51.

When it is determined that the value of the anti-shake operation determination parameter CAM_DIS is set to 1, the value of the time interval parameter T is increased by the value of 1 in step S52 and the interruption process of the timer is completed.

Otherwise, the anti-shake operation SR_SUB(T) that is based on the time interval parameter T, commences in step S53. The detail of the anti-shake operation SR_SUB(T) is explained later by using the flowchart in FIG. 6. In step S54, the value of the time interval parameter T is set to 1 and the interruption process of the timer is completed.

Figure 6:
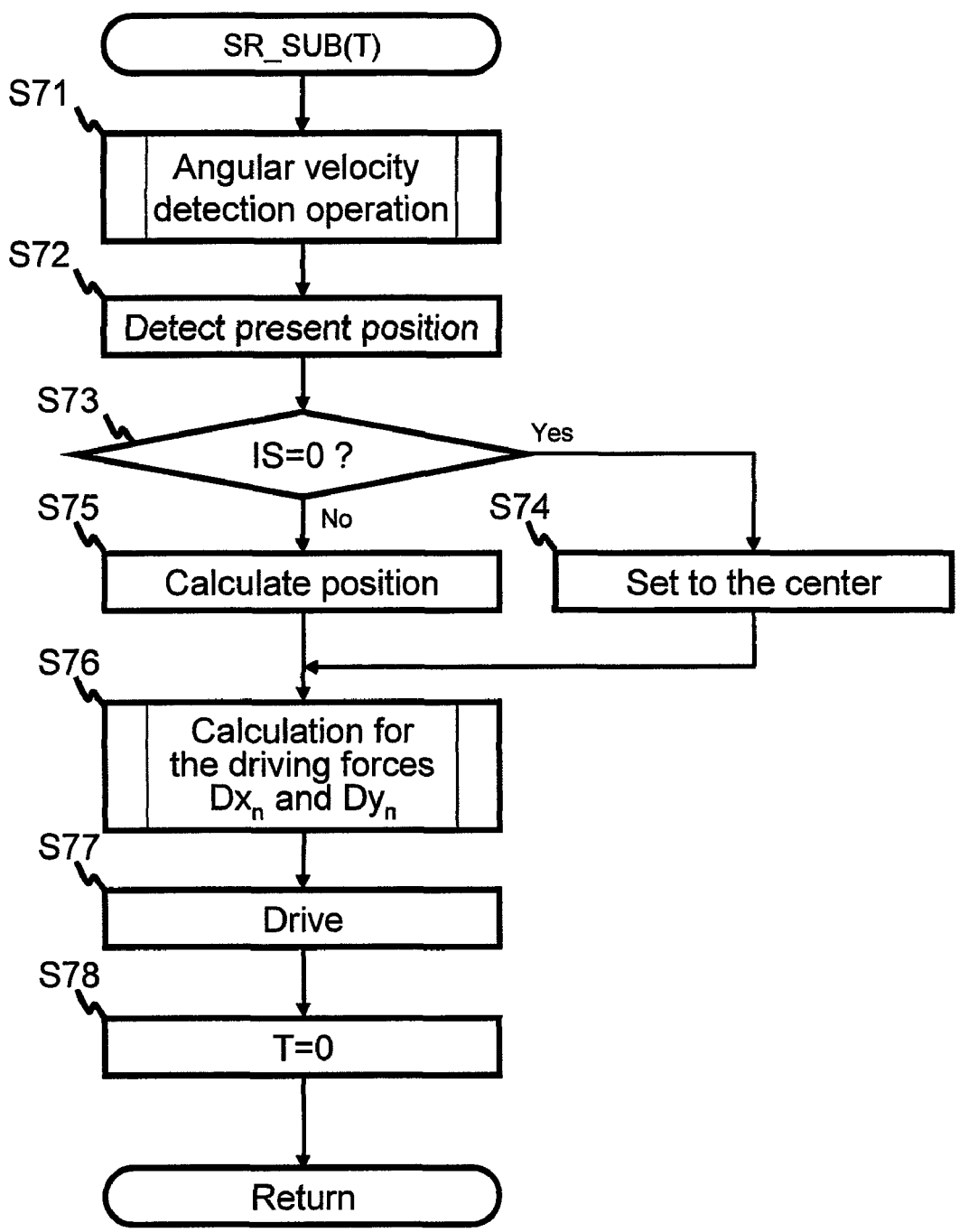
FIG. 6 is a flowchart that shows the detail of the anti-shake operation.

Next, the anti-shake operation SR_SUB(T), which is performed in step S53 in FIG. 5, is explained by using the flowchart in FIG. 6.

When the anti-shake operation SR_SUB(T) commences, the first angular velocity vx, which is output from the angular velocity detection unit 25, is input to the A/D converter A/D 0 of the CPU 21 and converted to the first digital angular velocity signal $Vx_n$ in step S71. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$). The detail of the digital high-pass filter processing operation is explained later by using the flowchart in FIG. 7.

In step S72, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S73, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S74. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S75.

In step S76, the first driving force $Dx_n$ (the first PWM duty dx) and the second driving force $Dy_n$ (the second PWM duty dy) of the driving force $D_n$ which moves the movable unit 30a to the position $S_n$, are calculated on the basis of the position $S_n$ ($Sx_n$, $Sy_n$) that was determined in step S74 or step S75, and the present position $P_n$ ($pdx_n$, $pdy_n$).

In step S77, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

In step S78, the value of the time interval parameter T is set to 0 and the anti-shake operation SR_SUB(T) is completed.

The process of steps S76 and S77 is an automatic control calculation, which is used with the PID automatic control for performing general (normal) proportional, integral, and differential calculations.

Figure 7:
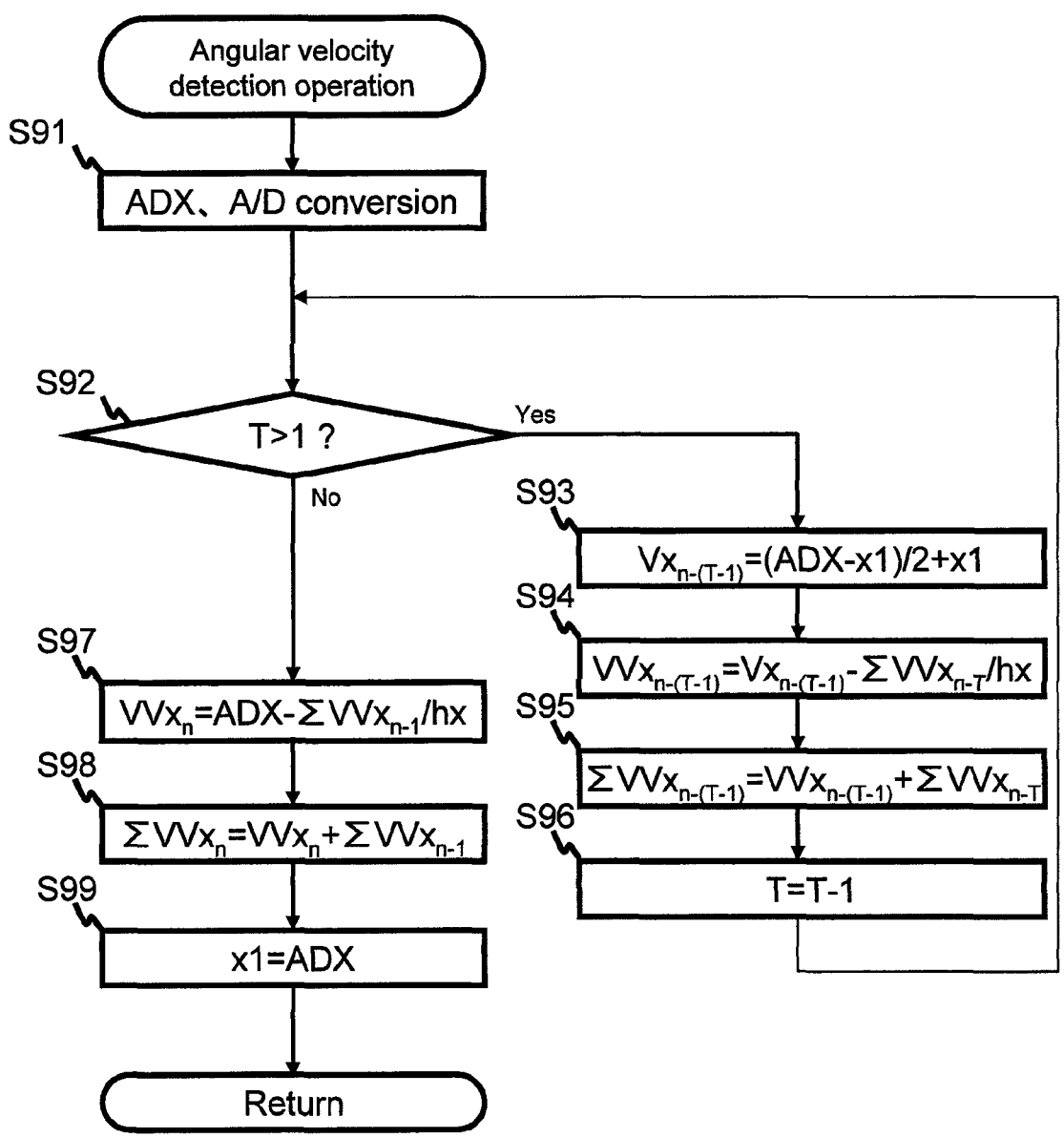
FIG. 7 is a flowchart that shows the detail of the digital high-pass filter processing operation.

Next, the detail of the angular velocity detection operation and the digital high-pass filter processing operation in step S71 of FIG. 6 are explained by using the flowchart in FIG. 7.

The latest value ADX is set equal to the latest digital angular velocity signal that is output from the first amplifier 28a of the angular velocity detection unit 25 and then converted from an analog to digital signal at the latest time point.

Similarly, the second latest value ADY is set equal to the latest digital angular velocity signal that is output from the second amplifier 28b of the angular velocity detection unit 25 and then converted from an analog to digital signal at the latest time point.

Further, the first preceding value x1 is set equal to a preceding digital angular velocity signal output from the first amplifier 28a of the angular velocity detection unit 25 and then converted from an analog to digital signal immediately before the latest time point.

Similarly, the second preceding value y1 is set equal to a preceding digital angular velocity signal output from the second amplifier 28b of the angular velocity detection unit 25 and then converted from an analog to digital signal immediately before the latest time point.

The values of the first latest value ADX, the second latest value ADY, the first preceding value x1, and the second preceding value y1 are stored in the CPU 21.

When the angular velocity detection operation commences, the output signals from the first and second amplifiers 28a and 28b that are the first and second angular velocities vx and vy, are input to the A/D converters A/D 0 and A/D 1 whereupon they undergo A/D conversion so that the A/D converted values are then set to the first and second latest values ADX and ADY, in step S91.

In step S92, it is determined whether the value of the time interval parameter T is greater than 1. When it is determined that the time interval parameter T is greater than 1, the operation continues to step S93; otherwise, the operation proceeds directly to step S97.

In step S93, the first digital angular velocity signal $Vx_{n-(T-1)}$ is calculated based on the first latest value ADX ($=Vx_n$) and the first preceding value x1 ($=Vx_{n-T}$) ($Vx_{n-(T-1)}=(ADX-x1)\div 2+x1$). Similarly, the second digital angular velocity signal $Vy_{n-(T-1)}$ is calculated based on the second latest value ADY ($=Vy_n$) and the second preceding value y1 ($=Vy_{n-T}$) ($Vy_{n-(T-1)}=(ADY-y1)\div 2+y1$).

In step S94, the first digital angular velocity $VVx_{n-(T-1)}$ is calculated based on the difference between the first digital angular velocity signal $Vx_{n-(T-1)}$, and the quotient of the summation from the first digital angular velocity $VVx_1$ at the point when the time t is 1 (t=1) to the first digital angular velocity $VVx_{n-T}$ at the point when the time t is n-T (t=n-T) and the first high-pass filter time constant hx ($VVx_{n-(T-1)}=VX_{n-(T-1)}-(\Sigma VVx_{n-T})\div hx$).

Similarly, the second digital angular velocity $VVy_{n-(T-1)}$ is calculated based on the difference between the second digital angular velocity signal $Vy_{n-(T-1)}$, and the quotient of the summation from the second digital angular velocity $VVy_1$ at the point when the time t is 1 (t=1) to the second digital angular velocity $VVy_{n-T}$ at the point when the time t is n-T (t=n-T) and the second high-pass filter time constant by ($VVy_{n-(T-1)}=Vy_{n-(T-1)}-(\Sigma VVy_{n-T})\div hy$).

In step S95, the summation from the first digital angular velocity $VVx_1$ at the point when the time t is 1 (t=1) to the first digital angular velocity $VVx_{n-(T-1)}$ at the point when the time t is n-(T-1) (t=n-(T-1)) is calculated based on the first digital angular velocity $VVx_{n-(T-1)}$ that is calculated in step S94 and the summation from the first digital angular velocity $VVx_1$ at the point when the time t is 1 (t=1) to the first digital angular velocity $VVx_{n-T}$ at the point when the time t is n-T (t=n-T) ($\Sigma VVX_{n-(T-1)} = VVX_{n-(T-1)} + \Sigma VVx_{n-T}$).

Similarly, the summation from the second digital angular velocity $VVy_1$ at the point when the time t is 1 (t=1) to the second digital angular velocity $VVy_{n-(T-1)}$ at the point when the time t is n-(T-1) (t=n-(T-1)) is calculated based on the second digital angular velocity $VVy_{n-(T-1)}$ that is calculated in step S94 and the summation from the second digital angular velocity $VVy_1$ at the point when the time t is 1 (t=1) to the second digital angular velocity $VVy_{n-T}$ at the point when the time t is n-T (t=n-T) ($\Sigma VVy_{n-(T-1)=VVyn-(T-1)} + \Sigma VVy_{n-T}$).

In step S96, the value of the time interval parameter T is decreased by the value of 1, and the operation is returned to step S92.

By repeating the interpolation processing operation in steps S92 to S96, the digital angular velocity signal can be calculated at the predetermined time interval during the non-operation period, from the point when the time t is n-(T-1) (t=n-(T-1) to the point when the time t is n-1 (t=n-1), a period during which the angular velocity detection operation cannot be performed at the predetermined time interval.

In the case where the angular velocity detection operation is not performed at the predetermined time interval, the secondary integration processing operation is performed without calculating the digital angular velocity signals during the non-operation period, an error may occur due to the lack of data from the non-operation period.

In the first embodiment, however, because the digital angular velocity signals etc. can be calculated during the non-operation period by the interpolation processing operation, the error from the integration processing operation is reduced so that the error in the anti-shake operation is mitigated.

Figure 9:
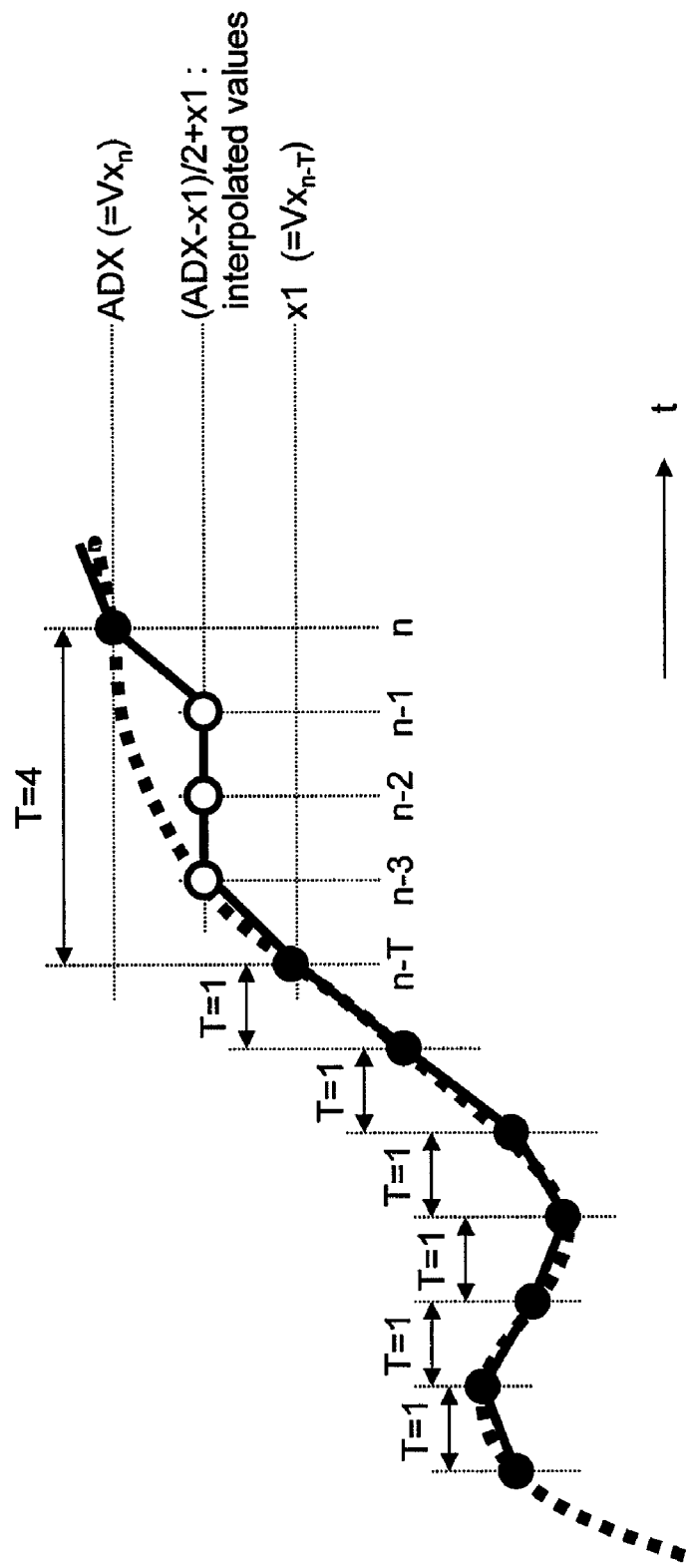
FIG. 9 is a graph that shows the interpolated values (the first digital angular velocity signals) that are calculated by average interpolation in the non-operation period, when the value of the time interval parameter T is 4.

FIG. 9 shows the interpolated values (the first digital angular velocity signals $Vx_{n-3}$, $Vx_{n-2}$, and $Vx_{n-1}$), that are calculated by interpolating from the time point t=n-(T-1)=n-3 to the time point t=n-1 in the non-operation period, when the value of the time interval parameter T is 4 (T=4).

In FIG. 9, the dotted line shows a waveform of an actual hand-shake, and the solid line represents a wave form of a detected hand-shake by the angular velocity detection operation (the first digital angular velocity signal Vx).

In FIG. 9, black dots show the values of the first digital angular velocity signals Vx that are calculated by the angular velocity detection operation, and white dots show the values of the first digital angular velocity signals Vx that are calculated by interpolating.

In step S97, the first digital angular velocity $VVx_n$ is calculated on the basis of the first latest value ADX, the first high-pass filter time constant hx, and the summation from the first digital angular velocity $VVx_1$ at the point when the time t is 1 (t=1) to the first digital angular velocity $VVx_{n-1}$ at the point when the time t is n-1 (t=n-T=n-1) ($VVx_n = ADX - \Sigma V-Vx_{n-1} \div hx$).

Similarly, the second digital angular velocity $VVy_n$ is calculated on the basis of the second latest value ADY, the second high-pass filter time constant hy, and the summation from the second digital angular velocity $VVy_1$ at the point when the time t is 1 (t=1) to the second digital angular velocity $VVy_{n-1}$ at the point when the time t is n-1 (t=n-T=n-1) ($VVy_n = ADY - \Sigma VVy_{n-1} \div hy$).

In step S98, the summation from the first digital angular velocity $VVx_1$ at the point when the time t is 1 (t=1) to the first digital angular velocity $VVx_n$ at the point when the time t is n (t=n) is calculated ($\Sigma VVx_n = VVx_n + \Sigma VVx_{n-1}$).

Similarly, the summation from the second digital angular velocity $VVy_1$ at the point when the time t is 1 (t=1) to the second digital angular velocity $VVy_n$ at the time t is n (t=n) is calculated ($\Sigma VVy_n = VVy_n + \Sigma VVy_{n-1}$).

In step S99, the value of the first preceding value x1 is set equal to the value of the first latest value ADX, and the value of the second preceding value y1 is set equal to the value of the second latest value ADY. Then, the angular velocity detection operation and the digital high-pass filter processing operation are complete.

Figure 10:
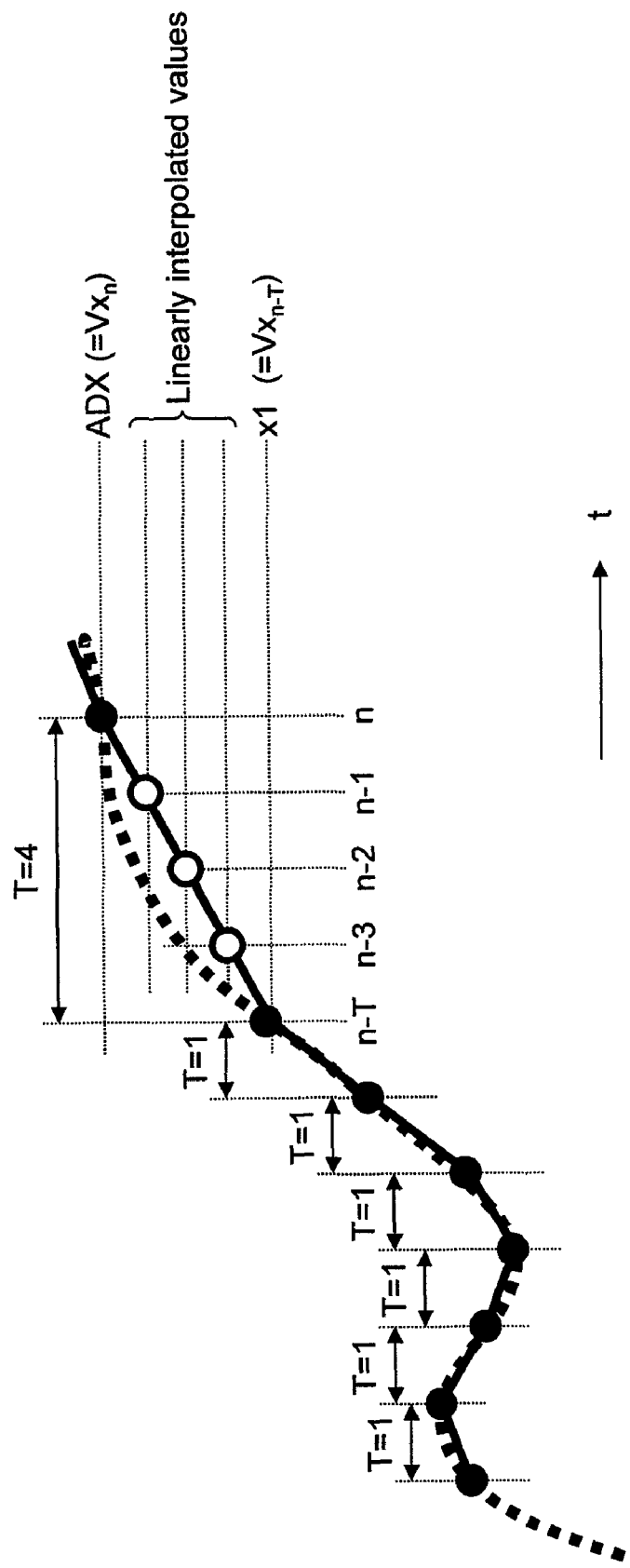
FIG. 10 is a graph that shows the interpolated values (the first digital angular velocity signals) that are calculated by linearly interpolation in the non-operation period, when the value of the time interval parameter T is 4.

In the first embodiment, the value of the first digital angular velocity signal $Vx_k$ (n-T<k<n-1) is calculated by interpolating based on the average value generated from the first angular velocity signal $Vx_{n-T}$ immediately before the non-operation period and the first angular velocity signal $Vx_n$ immediately after the non-operation period. However, another interpolating processing operation may be used, for example a linear interpolating processing operation as depicted in FIG. 10.

Next, the second embodiment is explained. In the first embodiment, the value of the sampling cycle θ is set to the fixed value (1 ms); however, in the second embodiment the value of the sampling cycle θ is set to a fixed value, except for when the non-operation period is in effect, at which time it is set to the value of the time interval parameter T. The points that differ from the first embodiment are explained as follows.

The value of the time interval parameter T is used as a parameter for the anti-shake operation. A process that is carried out when the value of the time interval parameter T is set to 1 is different from that when the value of the time interval parameter T is not set to 1 (see step S92 in FIG. 7 and step S111 in FIG. 11).

The value of the sampling cycle θ is set to the fixed value of 1 except during the non-operation period; in other words, while the anti-shake operation is performed at the predetermined time interval (1 ms). The value of the sampling cycle θ is set to the time interval parameter T that is variable in the non-operation period, a time period when the anti-shake operation is not carried out at the predetermined time interval (1 ms).

The time interval parameter T represents a time interval in which the anti-shake operation is performed. When the anti-shake operation can be performed at the predetermined time interval (1 ms), the value of the time interval parameter T is set equal to 1.

By setting the value of the sampling cycle θ to the fixed value, the processing speed can be increased compared to when the value of the sampling cycle θ is variable.

In the second embodiment, the processing speed for calculating the first and second driving forces $Dx_n$ and $Dy_n$ can be increased while the anti-shake operation is performed at the predetermined time interval, compared to when the value of the sampling cycle θ is variable.

Figure 11:
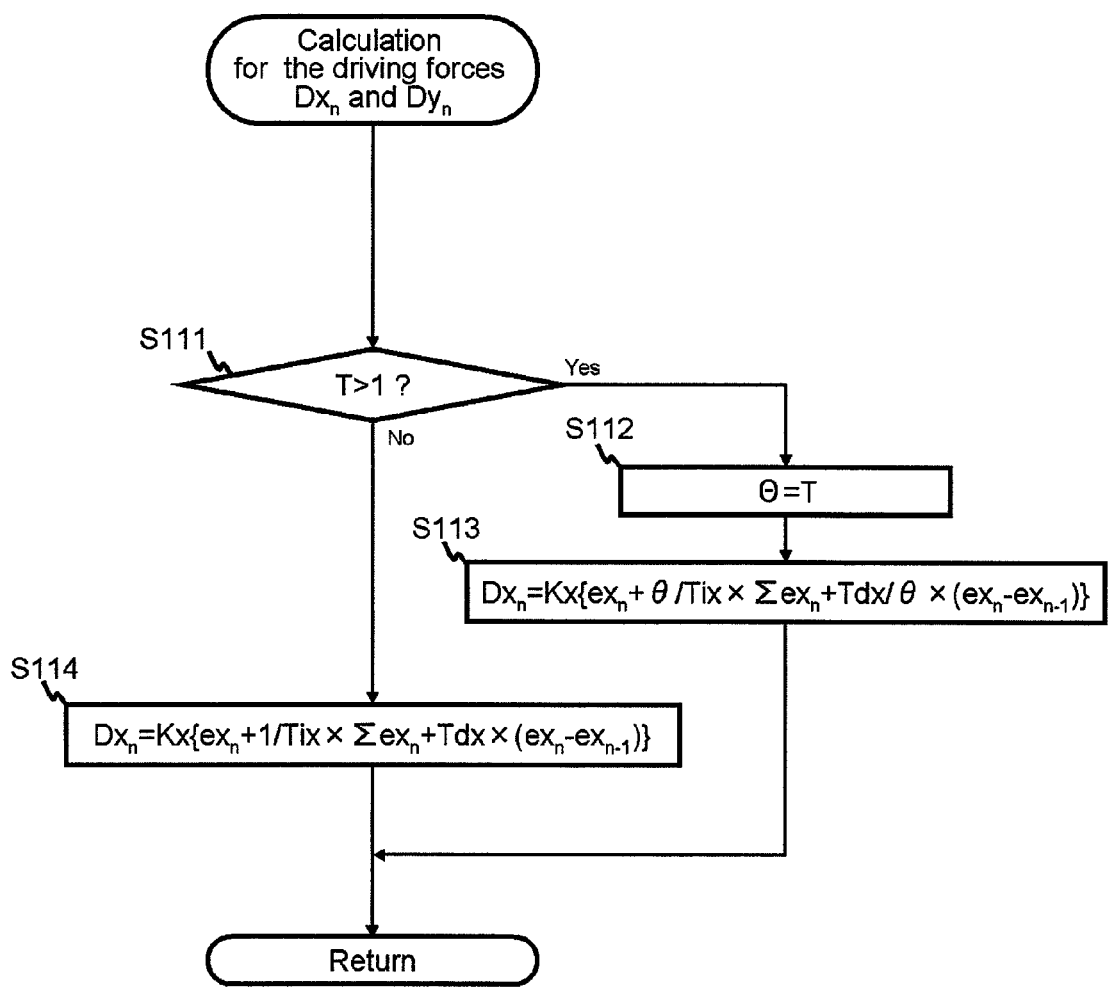
FIG. 11 is a flowchart that shows the detail of the automatic control calculation.

Next, the detail of the calculation for the first and second driving forces $Dx_n$ and $Dy_n$ in step S76 in FIG. 6 is explained by using the flowchart in FIG. 11. When the calculation for the first and second driving forces $Dx_n$ and $Dy_n$ in step S76 commences, it is determined whether the value of the time interval parameter T is greater than 1, in step S111.

When it is determined that the value of the time interval parameter T is greater than 1 (T>1), the operation continues to step S112. Otherwise, the operation proceeds directly to step S114.

In step S112, the value of the sampling cycle θ is set to the value of the time interval parameter T. In step S113, the first driving force $Dx_n$ is calculated based on the first subtraction values $ex_n$ and $ex_{n-1}$, the first proportional coefficient Kx, the sampling cycle θ, the first integral coefficient Tix, and the first differential coefficient Tdx ($Dx_n=Kx\times\{ex_n+\theta\div Tix\times\Sigma ex_n+Tdx\div\theta\times(ex_n-ex_{n-1})\}$).

Similarly, the second driving force $Dy_n$ is calculated based on the second subtraction values $ey_n$ and $ey_{n-1}$, the second proportional coefficient Ky, the sampling cycle θ, the second integral coefficient Tiy, and the second differential coefficient Tdy ($Dy_n=Ky\times\{ey_n+\theta\div Tiy\times\Sigma ey_n+Tdy\div\theta\times(ey_n-ey_{n-1})\}$). Then the automatic control calculation is completed.

In step S114, the first driving force $Dx_n$ is calculated based on the first subtraction values $ex_n$ and $ex_{n-1}$, the first proportional coefficient Kx, the first integral coefficient Tix, and the first differential coefficient Tdx ($Dx_n=Kx\times\{ex_n+1\div Tix\times\Sigma ex_n+Tdx\times(ex_n-ex_{n-1})\}$).

Similarly, the second driving force $Dy_n$ is calculated based on the second subtraction values $ey_n$ and $ey_{n-1}$, the second proportional coefficient Ky, the second integral coefficient Tiy, and the second differential coefficient Tdy ($Dy_n=Ky\times\{ey_n+1\div Tiy\times\Sigma ey_n+Tdy\times(ey_n-ey_{n-1})\}$).

Therefore, the processing speed in step S114 can be increased by omitting the substitution of the value of the sampling cycle θ compared to that in step S113. Then the automatic control calculation is completed.

In the first and second embodiments, the non-operation period in which the predetermined operation, in the imaging operation and in the image processing operation is performed, includes the imaging preparation period that includes the photometric operation in the AE unit 23, the AE period in which the information regarding the aperture value and the time length of the exposure is transmitted from the AE unit 23 to the CPU 21 (see step S16 in FIG. 4), the AF period in which the information regarding the AF sensing operation is transmitted from the AF unit 24 to the CPU 21 (see step S19 in FIG. 4), and the communication period between the CPU 21 and the DSP 19 (see steps S25 and S32 in FIG. 4). However, another period may be set to correspond to the processing capability of the CPU 21, for example, the communication period between the AF unit 24 and the CPU 21 to perform the integration calculation for the AF sensing operation in step S17 in FIG. 4.

In the first and second embodiments, it is explained that the movable unit 30a has the imaging device. However, the movable unit 30a may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. 2006-192849 (filed on Jul. 13, 2006) and 2006-192711 (filed on Jul. 13, 2006), which are expressly incorporated herein by reference, in their entirety.

The invention claimed is:

1. An anti-shake apparatus comprising:
    an angular velocity sensor for detecting an angular velocity; and
    a controller that controls said angular velocity sensor and performs an anti-shake operation based on an output signal from said angular velocity sensor;
    said controller calculating an angular velocity signal at predetermined time intervals based upon an output signal from said angular velocity sensor;
    said controller not detecting an output signal from said angular velocity sensor during a predetermined period; and
    said controller calculating an angular velocity signal, during the predetermined period, based on the output signal from said angular velocity sensor before the predetermined period which is longer than one of the predetermined time intervals and based upon the output signal from said angular velocity sensor after the predetermined period.

2. The anti-shake apparatus according to claim 1, wherein said controller calculates, said angular velocity signal, at the predetermined time intervals, during said predetermined period.

3. The anti-shake apparatus according to claim 1, further comprising an AF unit that obtains information regarding an AF sensing operation;
    said predetermined period including an AF period in which said AF unit communicates with said controller.

4. The anti-shake apparatus according to claim 1, further comprising a DSP that performs an image processing operation on an image signal obtained from an imaging operation;
    said predetermined period including a period in which said DSP communicates with said controller.

5. The anti-shake apparatus according to claim 1, wherein the calculation, of said angular velocity signal at said predetermined time intervals, during said predetermined period is a based upon calculation of an average of the output signal from said angular velocity sensor before said predetermined period and the output signal from said angular velocity sensor after said predetermined period.

6. The anti-shake apparatus according to claim 1, wherein said angular velocity signal at said predetermined time interval during said predetermined period is calculated by linearly interpolating between the output signal from said angular velocity sensor before said predetermined period and the output signal from said angular velocity sensor after said predetermined period.

7. The anti-shake apparatus according to claim 1, wherein said controller detects a length of said predetermined period; and information regarding said length of said predetermined period is used for the calculation, of said angular velocity signal at said predetermined time intervals, during said predetermined period.

8. The anti-shake apparatus according to claim 7, wherein said information regarding said length of said predetermined period is used for an anti-shake processing operation including the calculation, of said angular velocity signal at said predetermined time intervals, during said predetermined period.

9. The anti-shake apparatus according to claim 1, further comprising an exposure calculating unit that performs a photometric operation;
    said predetermined period including an AE period in which the information regarding at least one of the aperture value and the time length of the exposure is transmitted from said exposure calculating unit to said controller.

10. A photographing apparatus comprising:

an angular velocity sensor for detecting an angular velocity;

a DSP that performs an image processing operation on an image signal obtained by an imaging operation; and a controller that controls said angular velocity sensor, performs an anti-shake operation based on an output signal from said angular velocity sensor, and performs a predetermined processing operation that is different from said anti-shake operation and from said image processing operation;

said controller calculating an angular velocity signal, based on the output signal from said angular velocity sensor before said predetermined processing operation and the output signal from said angular velocity sensor after said predetermined processing operation, at a predetermined time interval, during said predetermined processing operation, and calculating another angular velocity signal, based on the output signal from said angular velocity sensor before a communication period between said controller and said DSP and the output signal from said angular velocity sensor after said communication period between said controller and said DSP, at said predetermined time interval, during said communication period between said controller and said DSP;

a length of time of said predetermined processing operation being longer than the length of time necessary to perform said anti-shake operation one time.

11. The photographing apparatus according to claim 10, wherein a time period corresponding to said predetermined processing operation includes at least one of an AE period in which the information regarding at least one of the aperture value and the exposure time is transmitted to said controller, and an AF period in which the information regarding an AF sensing operation is transmitted to said controller.

* * * * *